US009250341B2

(12) United States Patent
Tang et al.

(10) Patent No.: US 9,250,341 B2
(45) Date of Patent: Feb. 2, 2016

(54) DEVICE AND METHOD FOR EXTRAPOLATING SPECULAR ENERGY OF REVERSE TIME MIGRATION THREE DIMENSIONAL ANGLE GATHERS

(75) Inventors: Bing Tang, Katy, TX (US); Sheng Xu, Katy, TX (US); Yu Zhang, Katy, TX (US)

(73) Assignee: CGGVERITAS SERVICES SA, Massy (FR)

( * ) Notice: Subject to any disclaimer, the term of this patent is extended or adjusted under 35 U.S.C. 154(b) by 954 days.

(21) Appl. No.: 13/454,547

(22) Filed: Apr. 24, 2012

(65) Prior Publication Data
US 2012/0275268 A1 Nov. 1, 2012

Related U.S. Application Data
(60) Provisional application No. 61/479,969, filed on Apr. 28, 2011.

(51) Int. Cl.
*G01V 1/28* (2006.01)
*G01V 1/36* (2006.01)

(52) U.S. Cl.
CPC .............. *G01V 1/36* (2013.01); *G01V 2210/51* (2013.01); *G01V 2210/52* (2013.01)

(58) Field of Classification Search
CPC .. G01V 1/36; G01V 2210/51; G01V 2210/52
USPC ................................ 367/50, 53, 38
See application file for complete search history.

(56) References Cited

U.S. PATENT DOCUMENTS 8,072,841 B2 * 12/2011 Chang .................... G01V 1/282
367/14
2012/0075954 A1 * 3/2012 Xu ......................... G01V 1/303
367/38

FOREIGN PATENT DOCUMENTS

GB 2483997 A 3/2012

OTHER PUBLICATIONS

Yu Zhang et al., "Practical Issues in Reverse Time Migration: True Amplitude gathers, noise removal and harmonic Source Encoding", First Break, vol. 27, Jan. 2009, pp. 53-59.
Yan Huang et al., "The Application of RTM 3D Gathers for Wide Azimuth Data in Garden Banks, Gulf of Mexico", SEG Denver 2010 Annual Meeting, pp. 3298-3302.
Shen Xu et al., "3D Coomon Image Gathers From Reverse Time Migration", SEG Denver 2010 Annual Meeting, pp. 3257-3260.

(Continued)

*Primary Examiner* — Daniel L Murphy
(74) *Attorney, Agent, or Firm* — Patent Portfolio Builders PLLC (57) ABSTRACT

Computer instructions, computing device and method for processing seismic data under-sampled in an angle domain, the seismic data corresponding to a reverse time migration, three-dimensional, angle domain common image gather (ADCIG). The method includes receiving the seismic data; calculating, based on the seismic data, shot and receiver wave-fields with an RTM wave propagation engine; applying a wave-fields decomposition algorithm to obtain a propagation direction for the shot and receiver wave-fields; forming the ADCIG by applying an image condition to the shot and receiver wave-fields; determining that specular energies of the ADCIG are under-sampled around a reflection angle; during the step of forming the ADCIG, extrapolating the specular energies to a neighborhood of the reflection angle; and generating an image of a subsurface that is being surveyed based on the extrapolated specular energies.

20 Claims, 11 Drawing Sheets

(56) References Cited

OTHER PUBLICATIONS

Yu Zhang et al., "Angle Gathers From Reverse Time Migration", The Leading Edge, Nov. 2010, pp. 1364-1371.
Big Tang et al., "Aliasing in RTM 3D Angle Gathers", SEG San Antonio 2011 Annual Meeting, pp. 3310-3314.
Jinjun Liu et al., "Automatic Event Picking and Tomography on 3D RTM Angle Gathers", SEG Denver 2010 Annual Meeting, pp. 4263-4268.
Sheng Xu et al., "Anti-leakage Fourier Transform for Seismic Data Regularization in Higher Dimensions", Geophysics, vol. 75, No. 6, Nov.-Dec. 2011, pp. WB113-WB120.
Sheng Xu et al., "3D Angle Gathers From Reverse Time Migration", Geophysics vol. 76, No. 2, Mar.-Apr. 2011, pp. S77-S92.
GB Search Report issued in related application No. GB1207354.0 and mailed on Jul. 31, 2012.

\* cited by examiner

DEVICE AND METHOD FOR EXTRAPOLATING SPECULAR ENERGY OF REVERSE TIME MIGRATION THREE DIMENSIONAL ANGLE GATHERS

CROSS REFERENCE TO RELATED APPLICATIONS

This application claims priority and benefit from U.S. Provisional Patent Application No. 61/479,969, filed Apr. 28, 2011, for "RTM 3D Angle Gathers Sampling Issues," authored by B. Tang and S. Xu, the entire contents of which are incorporated in their entirety herein by reference.

BACKGROUND

1. Technical Field

Embodiments of the subject matter disclosed herein generally relate to methods and systems for producing images of a subsurface and, more particularly, to mechanisms and techniques for reducing under-sampling associated noise for reverse time migration three-dimensional angle domain common image gathers.

2. Discussion of the Background

Marine seismic data acquisition and processing generate a profile (image) of the geophysical structure under the seafloor. While this profile does not provide an accurate location for the oil and gas, it suggests, to those trained in the field, the presence or absence of oil and/or gas. Thus, providing a high resolution image of the structures under the seafloor is an ongoing process.

Figure 1:
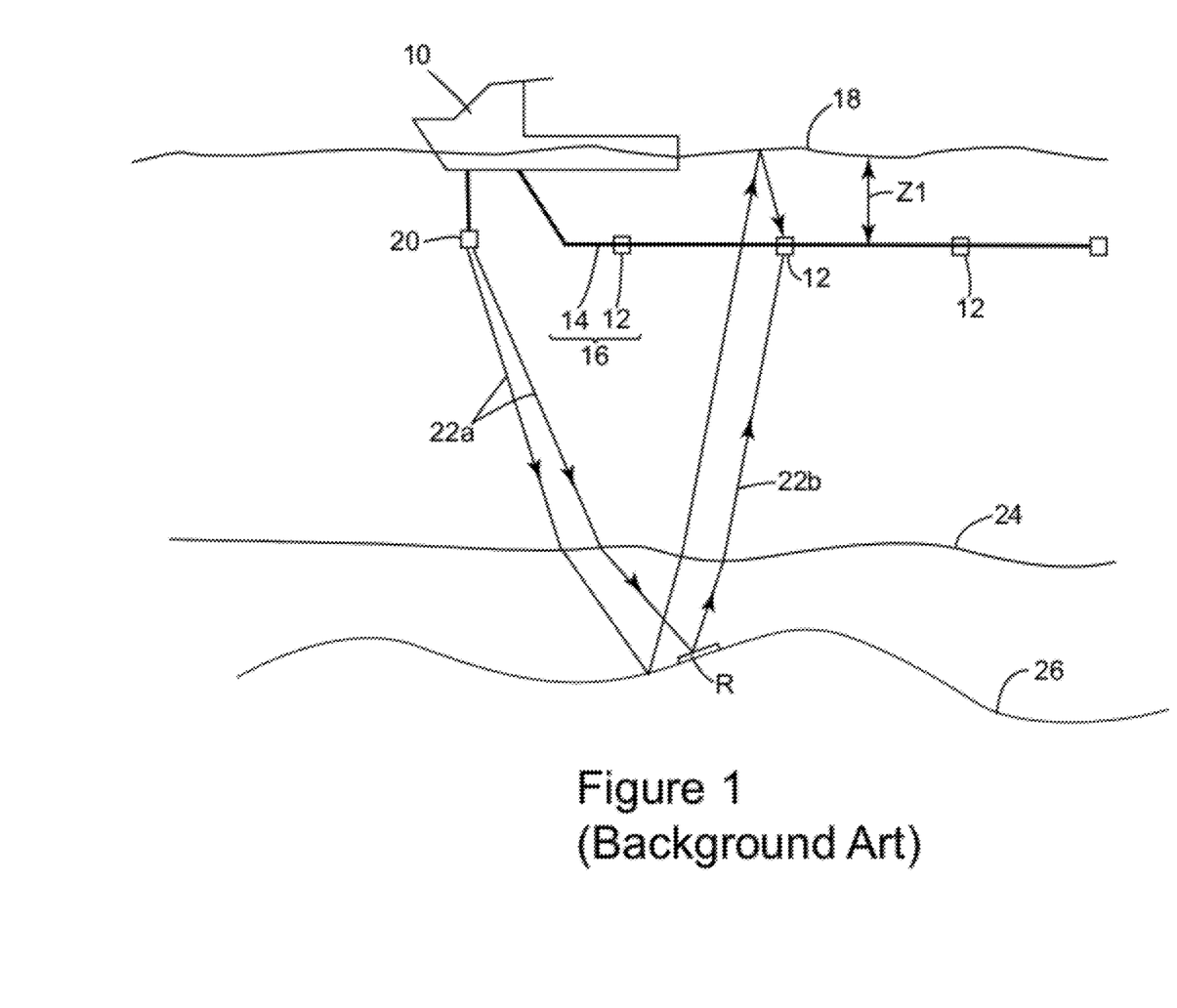
FIG. 1 is a schematic diagram of a conventional data acquisition setup.

During a seismic gathering process, as shown in FIG. 1, a vessel 10 tows an array of seismic receivers 12 provided on cables 14 that form streamers 16. The streamers may be disposed horizontally, i.e., lying at a constant depth z1 relative to a surface 18 of the ocean. The vessel 10 also tows a sound source assembly 20 that is configured to generate an acoustic wave 22a. The acoustic wave 22a propagates downwards toward the seafloor 24 and penetrates the seafloor until eventually a reflecting structure 26 (reflector R) reflects the acoustic wave. The reflected acoustic wave 22b propagates upwardly until is detected by receiver 12. The recorded data is then processed for producing an accurate image of the subsurface. The processing may include various phases, e.g., velocity model determination, pre-stack, migration, post-stack, etc., which are known in the art and thus, their description is omitted herein.

The availability of wide-azimuth (WAZ) data, together with reverse time migration (RTM), has increased the capability to image complex subsalt structures. The WAZ data provides better illumination of subsalt structures than the narrow azimuth (NAZ) data does. The abundant azimuthal information in WAZ data also produces better noise cancellation due to its higher folds (i.e., the number of recorded signals corresponding to a surveyed point in the subsurface).

For pre-stack depth migration, a common image gather (CIG) is the link to the velocity model building. The conventional CIGs are generated by Kirchhoff migration in the offset domain. Because the RTM provides better images than the Kirchhoff migrations when the structures are complicated (see Zhang, Y. and J. Sun, "Practical issues of reverse time migration: true-amplitude gathers, noise removal and harmonic-source encoding," First Break, 26, 19-25, 2009), it is necessary to generate CIGs from RTM to enhance the RTM usage of WAZ data process.

To retain the azimuthal information in WAZ data for tomography, the RTM CIGs have to be three dimensional (see Huang et al., "The application of RTM 3D gathers for wide azimuth data in Garden Banks, Gulf of Mexico," 80th Annual International Meeting, SEG Expanded Abstracts, 3298-3302, 2010). On the other hand, the usage of CIGs for reservoir attribute interpretation, such as amplitude versus angle/azimuth (AVA) analysis, requires amplitude fidelity.

Therefore, there is a need to incorporate the amplitude preserving algorithm in 3D angle-domain CIGs (ADCIGs). Based on the true-amplitude RTM theory, a method to generate 3D ADCIGs has been developed for a general anisotropic medium (see Xu et al., "3D common image gathers from reverse time Migration," 80th Annual International Meeting, SEG Expanded Abstracts, 3257-3262, 2010), and it has been applied to WAZ data processing (see Huang et al., 2010).

3D ADCIG with RTM is a superior choice for pre-stack imaging in complex geological areas (see Zhang et al., "Angle gathers from reverse time migration," The Leading Edge, 29, 1364-1371, 2010). The advantage of 3D ADCIGs is that they retain the localized subsurface information with respect to azimuth angles and reflection angles which can be used for velocity inversion, migration quality control, anisotropy model building and AVA analysis. For ADCIGs, the output traces from RTM are indexed by both the subsurface reflection angle $\theta$ and the azimuth angle $\alpha$.

Therefore, the RTM 3D ADCIG migration is in fact a mapping process in five dimensions which maps the WAZ data from a 5D input space $(x_s, y_s, x_r, y_r, t)$ to a 5D output space $(x, y, z, \theta, \alpha)$, where $x_s$ and $y_s$ are the coordinates of the source, $x_r$ and $y_r$ are the coordinates of the receiver, x, y, and z are the coordinates of a migrated point.

However, this technique introduces various challenges to the geophysicists. First, it dramatically increases the numerical cost because of the five dimensional mapping process and the finite difference wave-field propagation. Second, the locations of the sources and receivers are coarsely sampled on the surface and reflections from very near offsets are usually not recorded in marine streamer acquisitions. Thus, this mapping process leads to severe sampling issues. Xu et al. discussed how to reduce the computational cost by introducing a windows anti-leakage Fourier Transform technique. However, more analysis is necessary for addressing the sampling issues.

For current WAZ data processing, six azimuth sectors are output (see Huang et al., 2010). Thus, the migration output is oversampled in the azimuth angle domain, which does not cause a problem when the velocity model provides flat CIGs. On the other hand, the reflection angle is usually sampled in 1° to 2° increments. Sampling can be an issue when generating 3D ADCIGs. As will be discussed later, the events in the shallow ADCIGs are poorly sampled on the near angles and are better sampled on the far angles. In the deep part, the ADCIGs are generally oversampled. Thus, the gathers look normal when the velocity model is close to the real one.

However, when the velocity is off too much from the real velocity and the migrated events show curvatures on the ADCIGs, the amplitudes on the far angles are much attenuated with big angle intervals. As a result, the automatic event picking process may fail to pick the far angle curvatures for a further velocity update. Thus, there is a need to improve the signal-to-noise ratio (S/N) in RTM 3D ADCIGs. Accordingly, it would be desirable to provide systems and methods that avoid the afore-described problems and drawbacks.

SUMMARY

According to one exemplary embodiment, there is a method for processing seismic data under-sampled in an angle domain, the seismic data corresponding to a reverse time migration (RTM), three-dimensional, angle domain common image gather (ADCIG). The method includes a step of receiving at a processing device the seismic data recorded with plural receivers; a step of calculating, based on the seismic data, shot and receiver wave-fields with an RTM wave propagation engine; a step of applying a wave-fields decomposition algorithm to obtain a propagation direction for the shot and receiver wave-fields; a step of forming the ADCIG by applying an image condition to the shot and receiver wave-fields; a step of determining that specular energies of the ADCIG are under-sampled around a reflection angle; during the step of forming the ADCIG, extrapolating the specular energies to a neighborhood of the reflection angle; and a step of generating an image of a subsurface that is being surveyed based on the extrapolated specular energies.

According to another exemplary embodiment, there is a processing device for processing seismic data under-sampled in an angle domain, the seismic data corresponding to a reverse time migration, three-dimensional, angle domain common image gather (ADCIG). The processing device includes an interface configured to receive the seismic data recorded with plural receivers; and a processor connected to the interface. The processor is configured to, calculate, based on the seismic data, shot and receiver wave-fields with an RTM wave propagation engine; apply a wave-fields decomposition algorithm to obtain a propagation direction for the shot and receiver wave-fields; form the ADCIG by applying an image condition to the shot and receiver wave-fields; determine that specular energies of the ADCIG are under-sampled around a reflection angle; and during the step of forming the ADCIG, extrapolate the specular energies to a neighborhood of the reflection angle.

According to still another exemplary embodiment, there is a non-transitory computer readable medium storing computer instructions, which, when run by a computer, process seismic data under-sampled in an angle domain, the seismic data corresponding to a reverse time migration, three-dimensional, angle domain common image gather (ADCIG). The instructions include the steps noted in the above method.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology of three dimensional angle domain common image gathers calculated based on reverse time migration. However, the embodiments to be discussed next are not limited to 3D or RTM, but may be applied to other methods for producing final images of the subsurface.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for reducing the under-sampling noise for RTM 3D ADCIGs. 3D ADCIGs with reverse time migration is a powerful tool to image complex geological structures. For WAZ data processing, ADCIGs retain the localized subsurface information with respect to the azimuth and reflection angles, which are beneficial for velocity model update and reservoir attribute interpretation. For WAZ data, the energy is well distributed at the surface in the vector offset domain (e.g., time-space domain). However, in the subsurface angle domain, the shallow events are illuminated across a wide range of reflection angles, with a large interval of angle sampling. The analysis shows that the shallow events are under-sampled with coarse shot intervals. The under-sampling issue is more severe at the small reflection angles, resulting in new challenges to produce high quality ADCIGs. The above-noted method cures these issues as discussed next.

Figure 2:
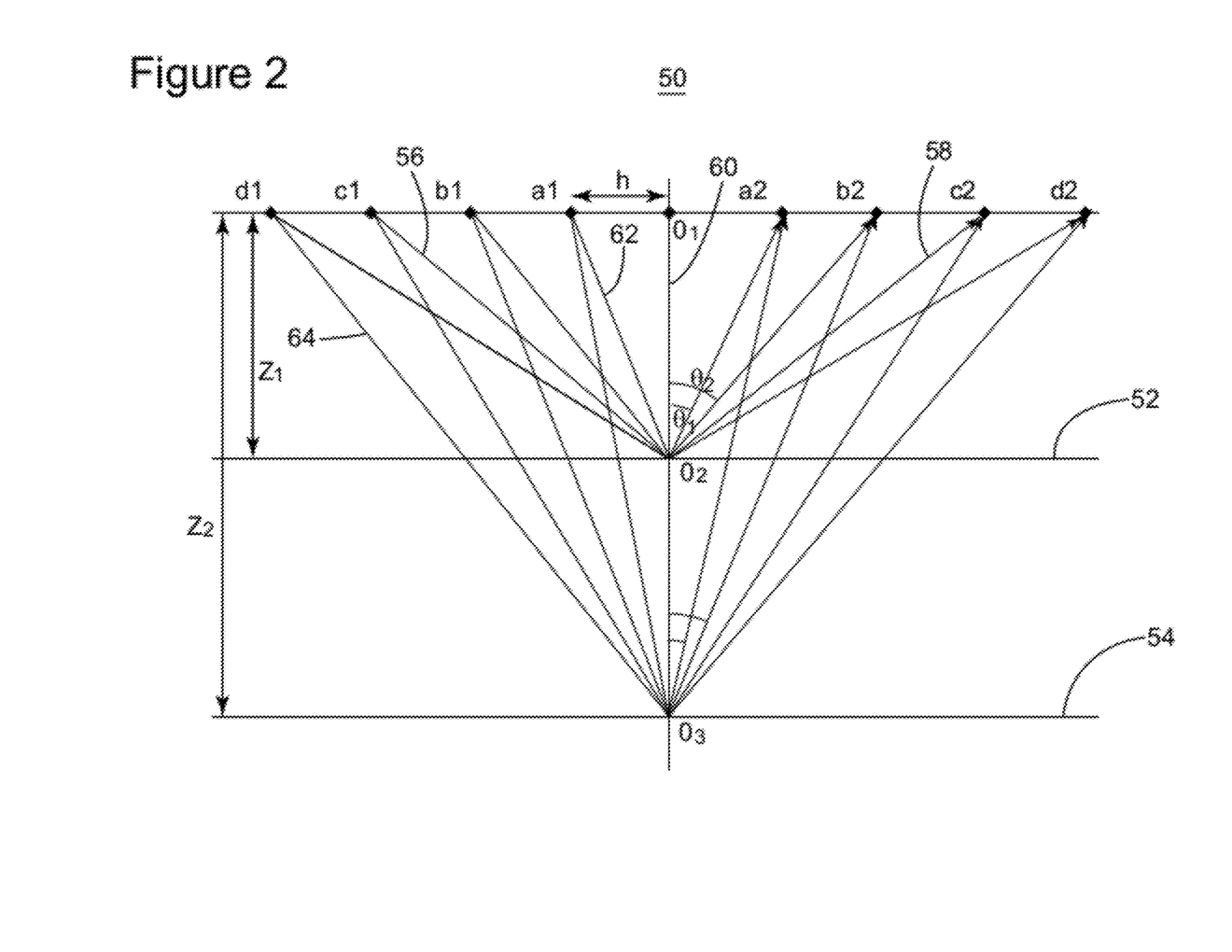
FIG. 2 is a schematic diagram that illustrates a sampling issue for an angle domain according to an exemplary embodiment.

It has been observed that the shallow events on real data ADCIGs suffer from under-sampling issues. A synthetic example is used herein to illustrate this problem. As shown in FIG. 2, a constant velocity medium 50 has several flat reflectors 52 and 54. A wave 56 emitted from a point c1 is shown being reflected at the reflector 52 and then the reflected wave 58 reaches the location c2. Similar wave paths are shown for other points and for other reflectors. It is noted that waves, e.g., 62, closer to the vertical line 60 corresponds to near angles and waves, e.g., 64, further away from the vertical line 60 corresponds to far angles. If the seismic reflection recorded at half offset "h" (offset is a distance between a source and a receiver) is migrated to a depth z with the correct velocity, the reflection angle θ is defined by $$\tan\theta = \frac{h}{z}. \quad (1)$$

Differentiating both sides of equation (1) with respect to h, the following relation is obtained:

$$d\theta = \sigma dh, \text{ where } \sigma = \frac{\cos^2\theta}{z}. \quad (2)$$

For a given acquisition geometry, the spacing of the shots and receivers is fixed, and, thus the half-offset spacing is fixed, i.e. dh≡const. Equation (2) shows that the specular energy (i.e., energy recorded due to a specular reflection, which may be defined as light from a single incoming direction is reflected into a single outgoing direction) from the acquired data is irregularly sampled in the reflection angle domain, i.e., for the shallow events with a small reflection angle θ, the angle conversion Jacobian σ is larger than that of the deeper events with a large reflection angle. In other words, in the time-space domain, the sampling of the recorded energy is regular or constant as the receivers are placed in such manner. However, when analyzing the same data from a reflection angle point of view, the same energy becomes irregular or under-sampled for the shallow events. For example, if the offset sampling rate dh=100 m, at a depth z=1.0 km, the effective angle sampling rate at the very near angle is 5.7°, which is too large for both AVA and tomography use.

This angular sample rate, or angular resolution, is also coarser than the 1°-2° spacing in reflection angle bins; that is, this data is under-sampled for angle gather calculations. Therefore, under-sampling issues may happen at the shallow events on ADGCIGs if all the contributions from the recorded data are directly summed. The problem is more severe at the near angles, and it is alleviated by a factor of $\cos^2\theta$ as the reflection angle θ increases. As the depth increases, the events on ADCIGs turn to be oversampled. If the velocity model is accurate enough to produce flat ADCIGs, an angle domain true amplitude migration automatically takes care of the over-sampled energy and leads to amplitude balanced ADCIGs.

Figure 3A:
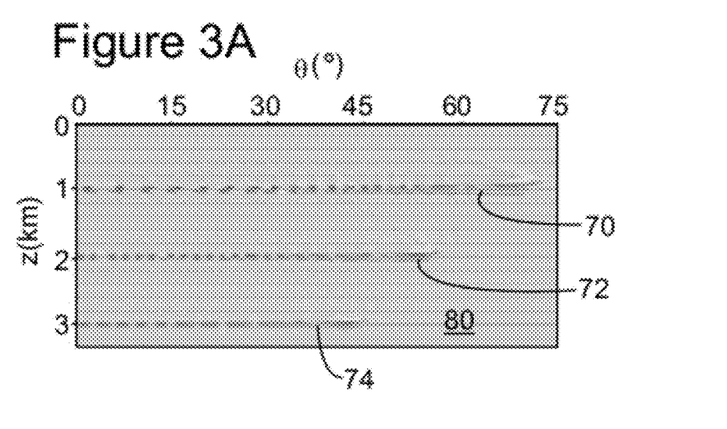
FIGS. 3A-C are graphs illustrating under-sampling effects in the angle domain for various shot spacing according to exemplary embodiments.
Figure 3B:
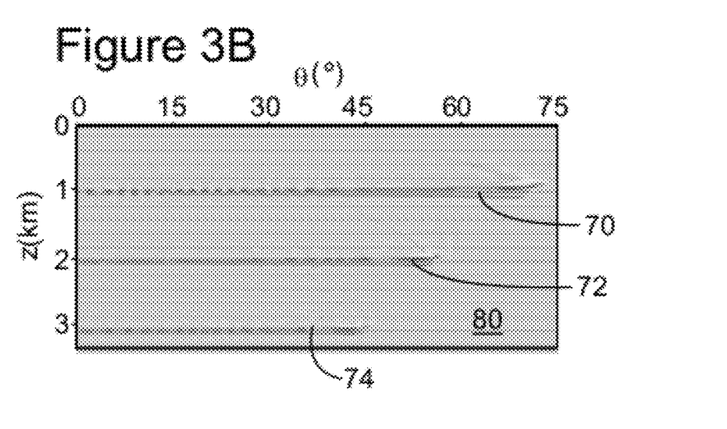
Figure 3C:
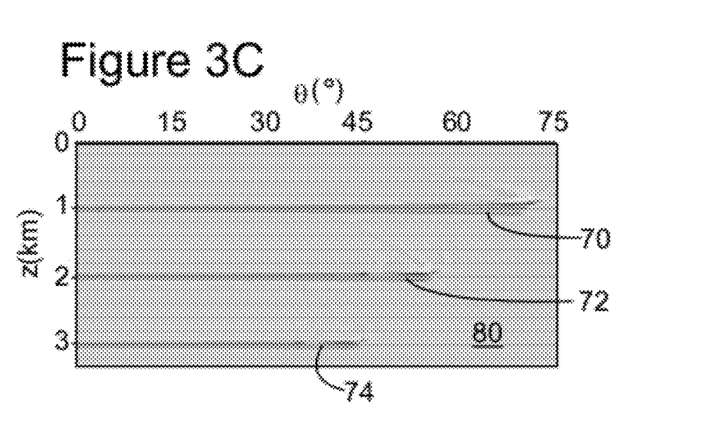

To illustrate the under-sampling problem on ADCIGs, three flat reflectors 70, 72 and 74 are considered at depths 1.0 km, 2.0 km and 3.0 km, respectively, in a constant velocity medium 80 with a velocity v=2000 m/s as illustrated in FIGS. 3A-C. The seismic data is generated on a dense receiver grid with 4 m interval between receivers and 5 km maximum offset in both inline and cross-line directions. The source is a Ricker wavelet with 15 Hz peak frequency. RTM is used to generate 3D ADCIGs.

FIGS. 3A-C compare the ADCIGs at 0° azimuth generated from different shot acquisition geometries. The amplitude jittering pattern which is caused by the under-sampling problem is visible on all three events at the near angles with 80 m×80 m shot sampling (see FIG. 3A). The poor sampling is reduced with finer shot spacing, as shown in FIG. 3Bb with 20 m×20 m shot sampling. The jittering pattern disappears in an extreme case, with 2 m×2 m shot spacing, as shown in FIG. 3C. This example confirms the problems noted-above related to the under-sampling for near angles.

For actual WAZ acquisition processes, the shots are sampled by 150 m in the inline direction and 500 m in the cross-line direction and, thus, the under-sampling problems on 3D ADCIGs are more severe than what have been shown in the synthetic example.

One way to solve this problem is to interpolate the seismic data at the surface. As illustrated in FIG. 3C, dense shot and receiver grid provides much cleaner ADCIGs. However, this simple solution is difficult to achieve for the following reasons. First, interpolating WAZ data is a computationally intensive task which requires handling a five dimensional input (see Xu et al., "Anti-leakage Fourier transform for seismic data regularization in higher dimension," Geophysics, 75, 113-120, 2010). Secondly, even if the data is perfectly interpolated on a dense grid, more than 10,000 times the original shot records are generated during the interpolation process, which tremendously increases the computational cost of a common shot RTM for a production project, because more shots have to be migrated to generate the 3D angle gathers.

Figure 4:
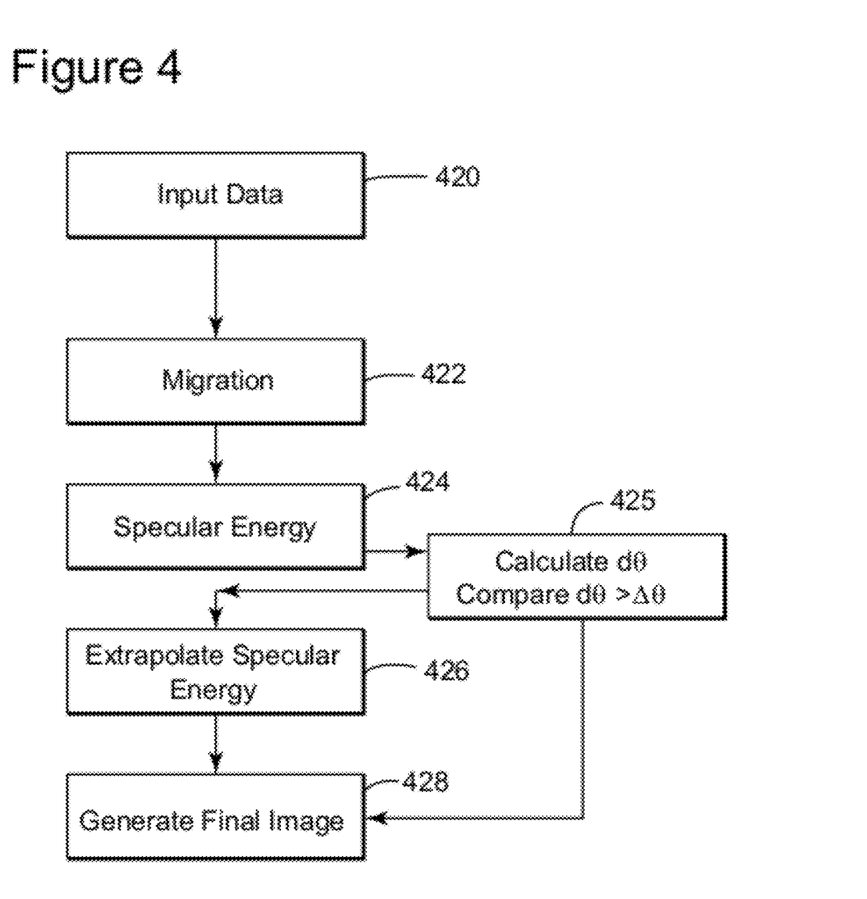
FIG. 4 is a flowchart of a method for extrapolating specular energy according to an exemplary embodiment.

A novel solution that does not increase the size of the input data is now discussed. The novel solution is a trade-off for improving the ADCIG quality and increasing the computational cost. According to an exemplary embodiment, the input data is received, as illustrated in FIG. 4, at step 420. However, instead of interpolating the input data (before the migration process) as in the traditional method, the novel method applies in step 422 the migration process to the unmodified input data (N data points). After obtaining the specular energy in step 424, the novel method extrapolates in step 426 the specular energies to corresponding neighborhoods based on the reflection angles. In other words, where the effective sampling rate becomes larger than a predetermined threshold, the specular energy is extrapolated to improve the sampling rate.

Figure 5:
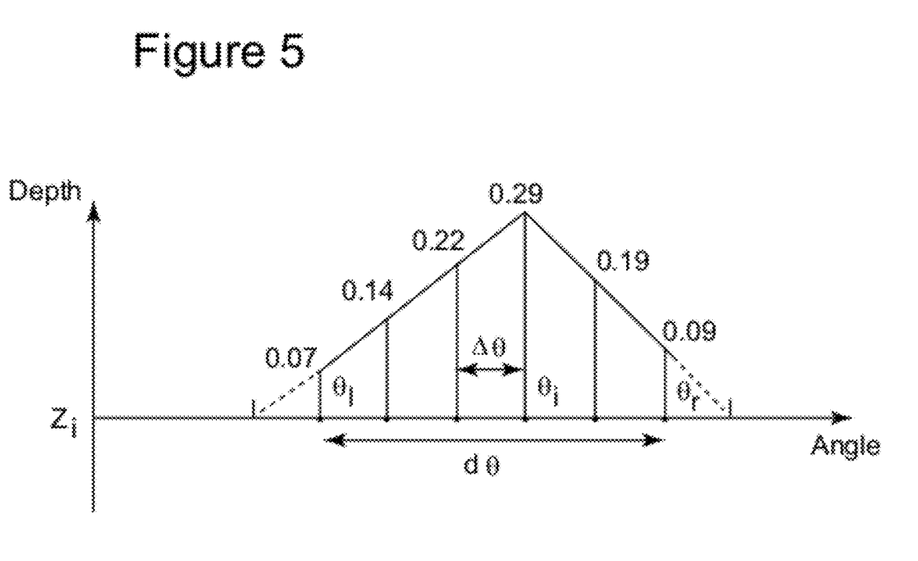
FIG. 5 is a schematic diagram illustrating how to estimate a weight with a kernel match method according to an exemplary embodiment.

For example, the novel method computes in step 425 a theoretical angular sampling dθ based on the real shot spacing and the depth of the imaging point, using equation (2). If dθ is larger than a user-defined output reflection angle interval Δθ, which indicates that the output ADCIG suffers from poor sampling, the method extrapolates in step 426 the corresponding specular energy to its neighborhood reflection angles with a proper weight. The weight can be estimated with a kernel match method. For each user-defined output angle $\theta_i$, the method uses the shot spacing Δx and the depth of the image point z to estimate a kernel diameter $d\theta=\theta_r-\theta_l$ with the angular sampling equation, and then it computes the weight for all the angles within the range of $[\theta_l,\theta_r]$ (those closer to $\theta_i$ receive higher weights). For example, if the user-defined output angle interval is Δθ=1, but the angular sampling for the image point $dz_i$ is 5 at depth $z_i$, there is a need to extrapolate the energy to all 5 traces in the range of $[\theta_l, \theta_r]$ as illustrated in FIG. 5. Otherwise, the method advances to step 428.

Figure 6A:
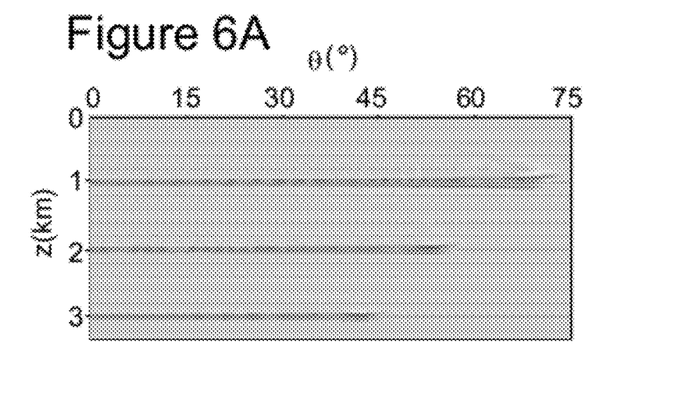
FIGS. 6A-C are graphs illustrating angle domain common image gathers calculated using extrapolated specular energy for various shot spacing according to exemplary embodiments.
Figure 6B:
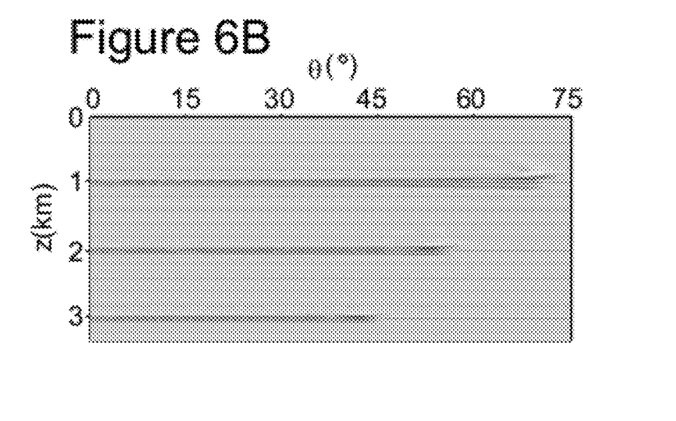
Figure 6C:
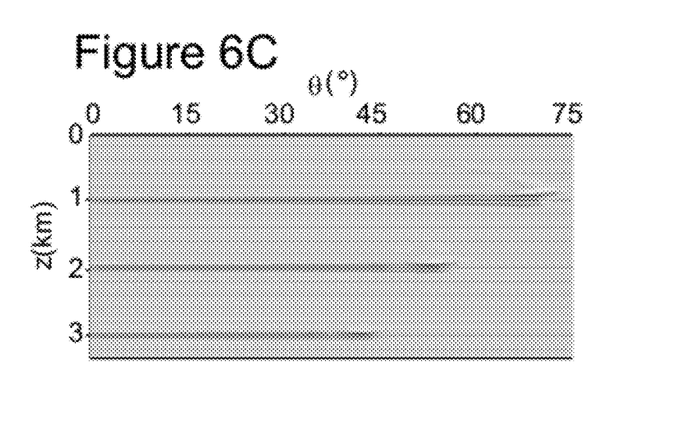

The extrapolation step 426 can be directly calculated based on, for example, the ratio of dθ/Δθ. This extrapolation step helps to fill-in the specular energy gap for the shallow events at smaller reflection angles. This step does not change the CIGs in the well-sampled regions. As a result, the resolution of ADCIGs is improved as shown in FIGS. 6A-C (compared to FIGS. 3A-C).

Figure 7A:
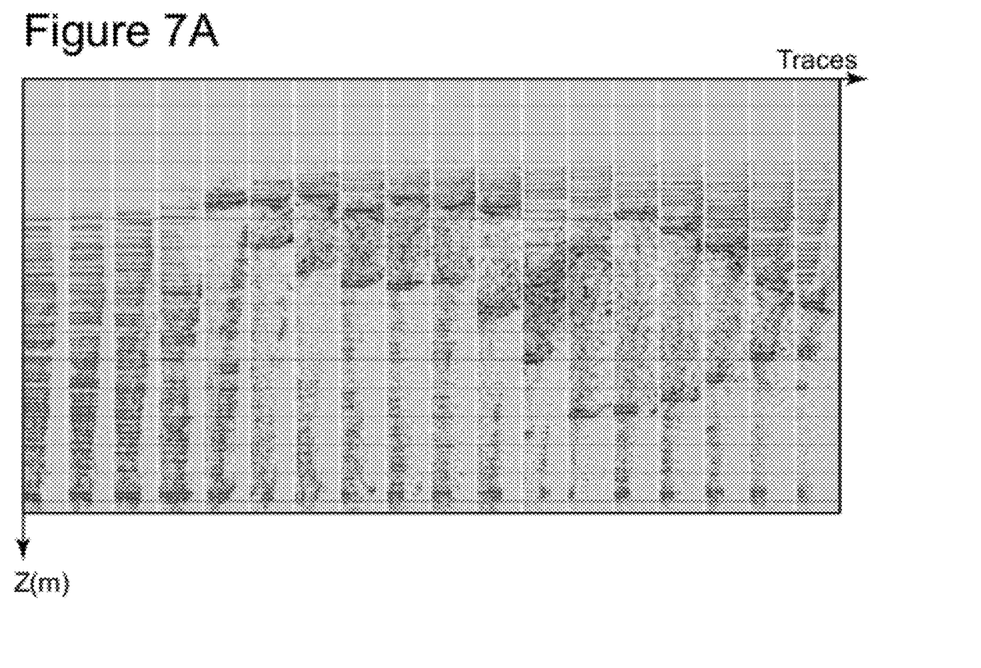
FIGS. 7A-B compare angle domain common image gathers calculated using the traditional approach and the extrapolated specular energy for a synthetic example.
Figure 7B:
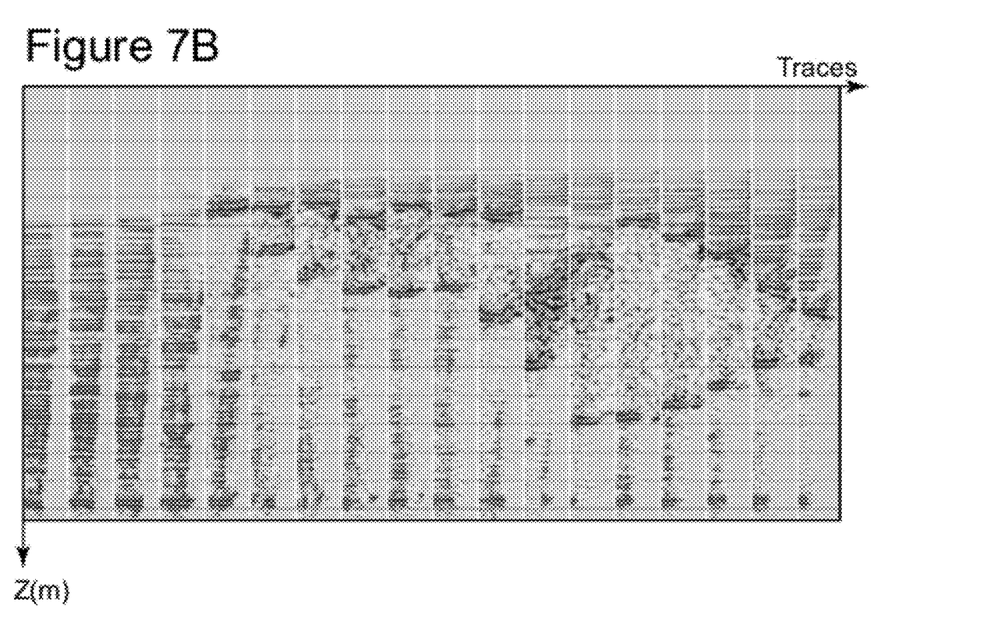

After implementing the novel extrapolation method discussed above to the same synthetic example shown in FIGS. 3A-C, the continuities of the seismic events are significantly improved (see FIGS. 6A-C), which is important for a better automatic events picking. The novel method has also been tested on a dataset which has complicated structures, as shown in FIG. 7A. The improvements on the shallow events after specular energy extrapolation are presented in FIG. 7B.

Figure 8A:
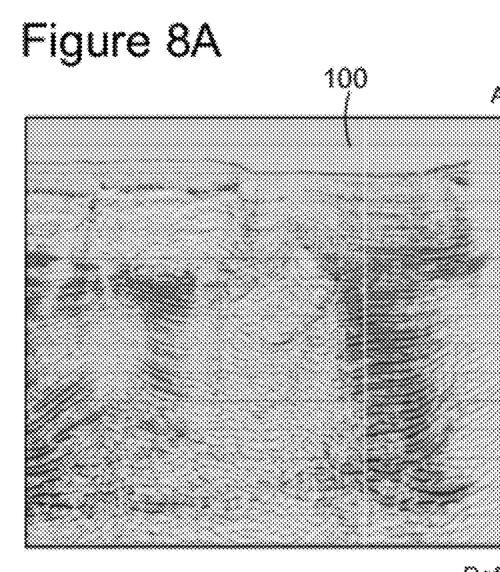
FIGS. 8A-D compare stacked images and angle domain common image gathers calculated using the traditional approach and the extrapolated specular energy for a real example.
Figure 8B:
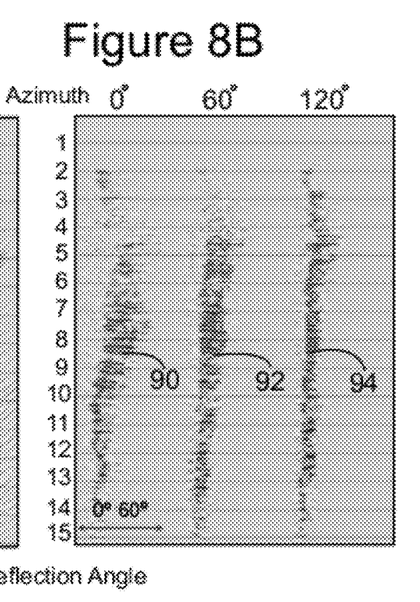
Figure 8C:
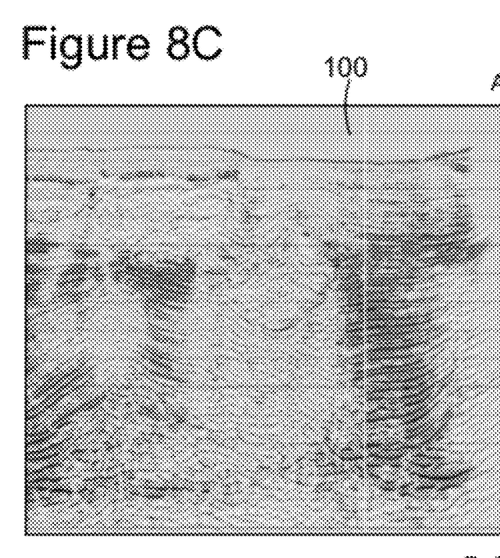
Figure 8D:
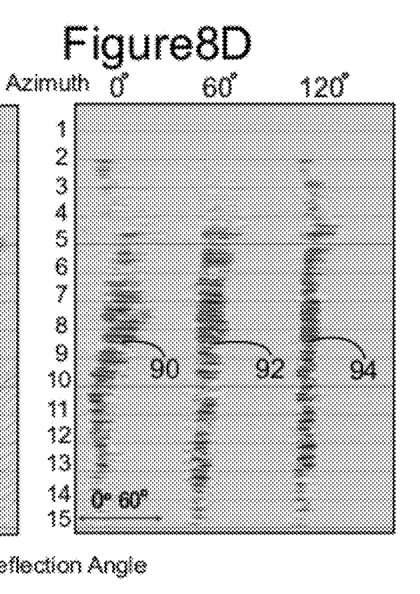

The novel specular energy extrapolation method has also been applied to a 3D dataset which is illustrated in FIGS. 8A-B and the results are presented in FIGS. 8C-D. The raw stacked image shown in FIG. 8A is compared to the one generated by the extrapolation method shown in FIG. 8C. The 3D ADCIGs with three azimuth sectors 90, 92 and 94 at one location (indicated by line 100) are shown in FIG. 8B for the classical method and in FIG. 8D for the novel method. The result with extrapolation (see FIG. 8D) shows improvements in the signal-to-noise ratio, compared to the one without extrapolation (see FIG. 8B).

The novel method discussed above addresses the under-sampling problems. However, there are also over-sampling problems that are worth being discussed.

Figure 9A:
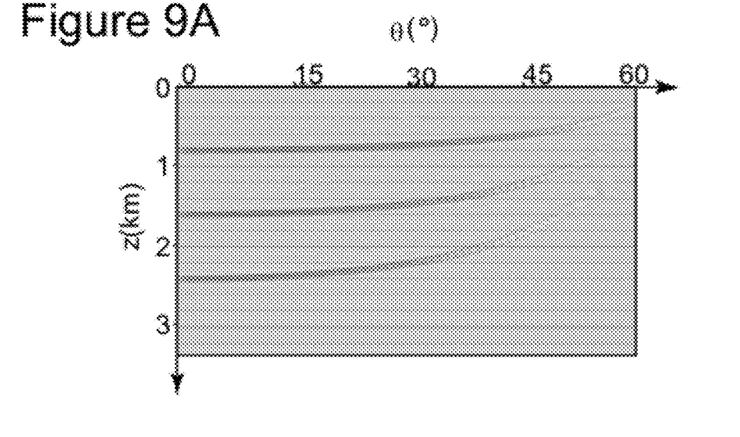
FIGS. 9A-C illustrate an over-sampling issue for angle domain common image gathers according to exemplary embodiments.
Figure 9B:
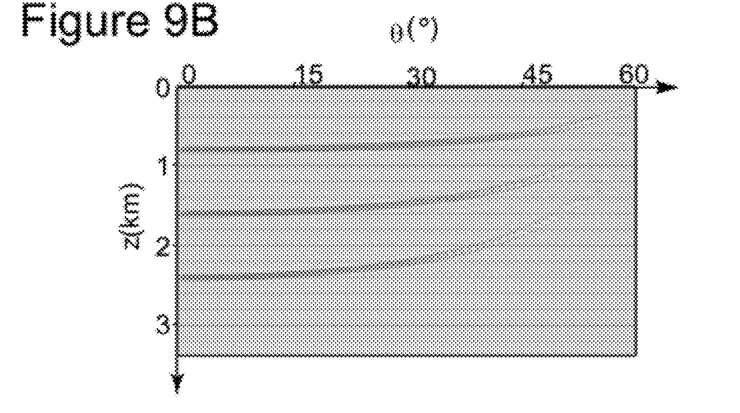
Figure 9C:
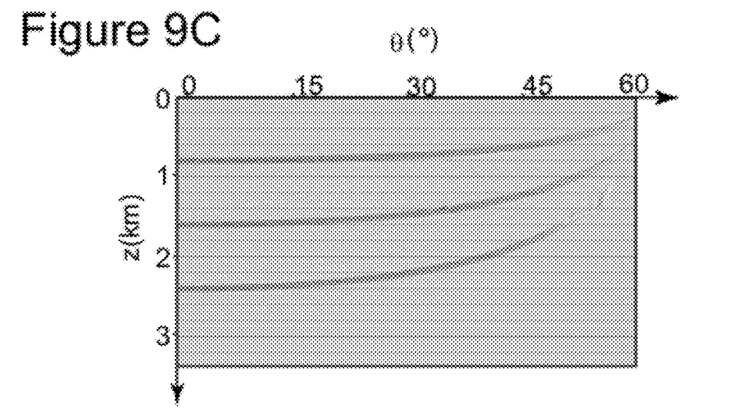

From equation (2), the far angles or deep events in ADCIGs are easily over-sampled, just the opposite when compared with the near angles. If the data is migrated with the correct velocity, the over-sampling of the specular energy improves the S/N as the coherent energies are stacked together. However, when the data is migrated with an incorrect velocity, the migrated events across a particular angular bin are not flat and part of the energies may be cancelled when staking them within a large angle interval. FIGS. 9A-C (plotted for $\Delta\theta=2°$, $\Delta\theta=1°$ and $\Delta\theta=0.2°$, where $\Delta\theta$ is the user-defined output reflection angle) show the ADCIGs migrated with a slower velocity model (20% slow-down of the exact model). The events on far angles are dimming out when the output reflection angle interval $\Delta\theta$ is large, as shown in FIG. 9A. However, with smaller angle sampling intervals, the curvatures caused by the incorrect velocity look more promising as shown in FIGS. 9B and 9C. This observation is important for using the ADCIGs for velocity update. Smaller angle sampling needs to be used to generate the ADCIGs for the residual curvature picking.

To summarize, for WAZ acquisition, the near angle events at shallow depth usually are under-sampled. This can be improved by a novel extrapolation scheme illustrated in FIG. 4. However, the events in the deeper part are oversampled in ADCIGs. This is not a problem when the velocity model is correct. However, it reduces the amplitude on far angles and causes problems for an automatic curvature picking when the velocity model is inaccurate and the angle sampling is too large. In this case, a smaller sampling interval in the reflection angle domain needs to be used. The synthetic examples discussed above have shown that the novel method leads to clean RTM 3D ADCIGs without much computational cost increase.

Figure 10:
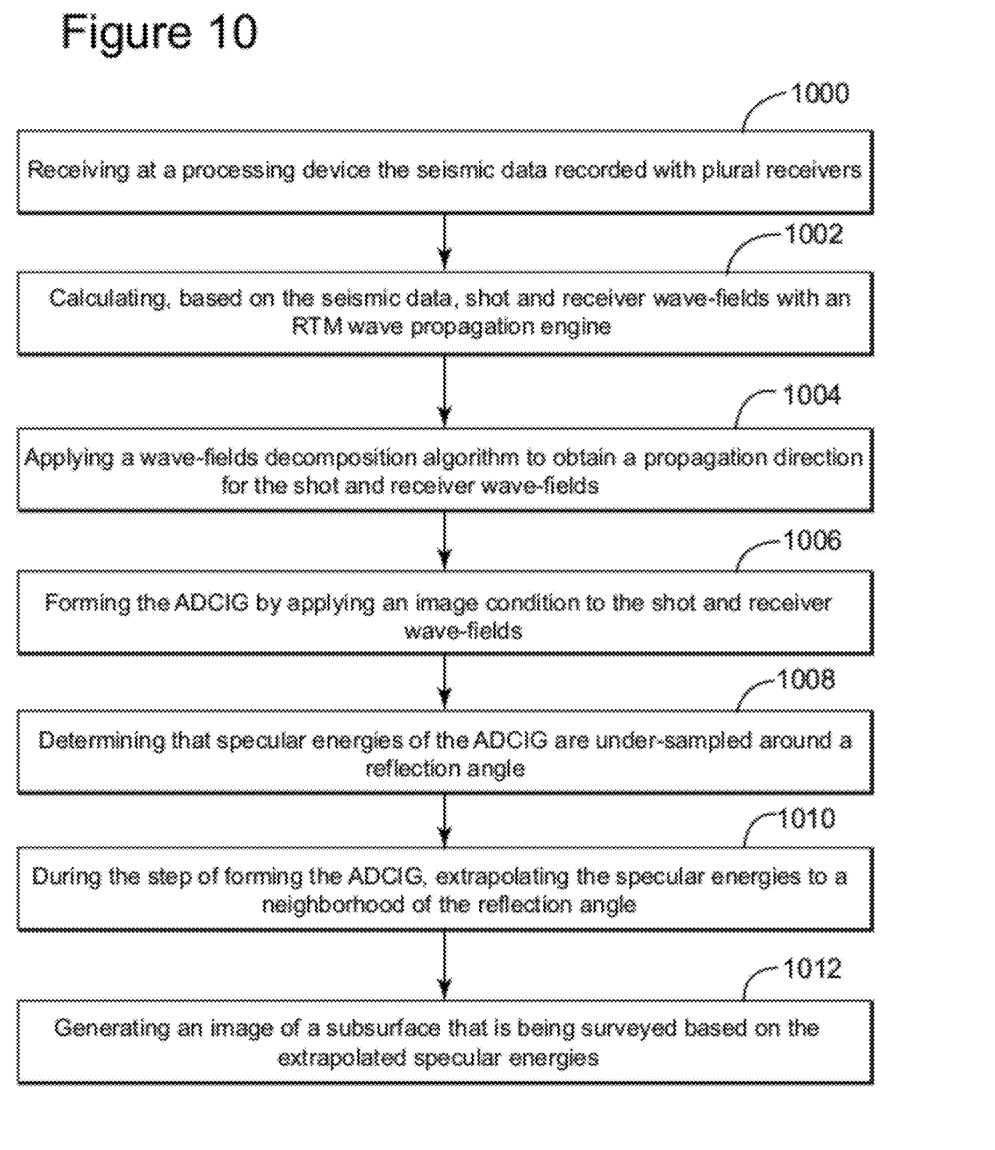
FIG. 10 is a flowchart of a method for a method for extrapolating specular energy according to an exemplary embodiment.
Figure 11:
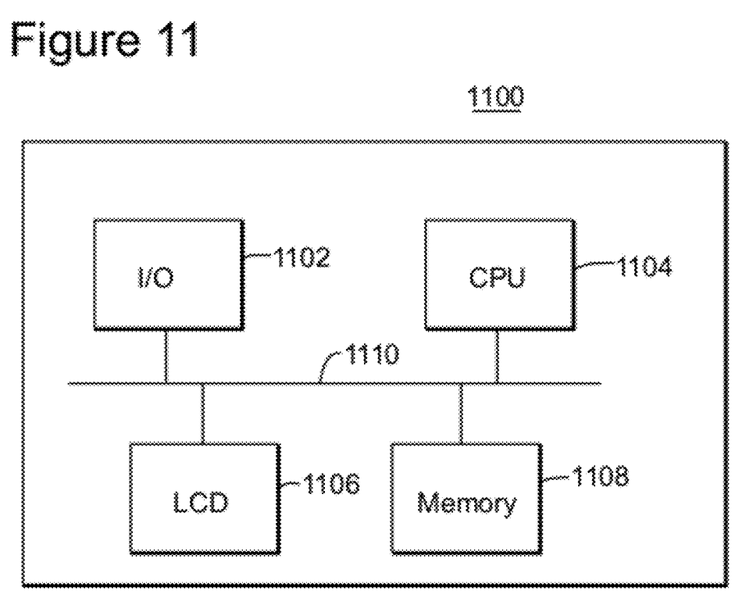
FIG. 11 is a schematic diagram of a processing device for calculating 3D angle gathers from reverse time migration according to an exemplary embodiment.

The method discussed with regard to FIG. 4 illustrates the novel concept at a general level that will be understood by those skilled in the art. Some of the steps were omitted in FIG. 4 for clarity. A more detailed flowchart is illustrated in FIG. 10. In step 1000, the recorded seismic data is received, for example, at a processing device that is illustrated in FIG. 11. Shot and receiver wave-fields are calculated in step 1002 with an RTM wave propagation engine (see, for example, U.S. Ser. No. 13/013,988, herein '988, assigned to CGGVeritas). A wave-fields decomposition algorithm (see '988) is applied in step 1004 to obtain a propagation direction for the shot and receiver wave-fields. The ADCIGs are formed in step 1006 by applying an image condition (see '988) to the shot and receiver wave-fields. It is noted that application '988 describes the wave-fields decomposition algorithm and the image condition and thus, these tools are not explain herein.

The specular energies of the under-sampled ADCIGs are determined in step 1008, around a reflection angle as explain above with regard to FIG. 4. In step 1010, the specular energies of the ADCIGs are extrapolated to a neighbourhood of the reflection angle during the step 1006 of forming the ADCIG. Optionally, in step 1012, the image of the subsurface being surveyed is being generated based on the extrapolated specular energies.

The above-discussed methods may be implemented, according to an exemplary embodiment, in a processing apparatus 1100 as illustrated in FIG. 11. The processing device 1100 may be specifically configured to calculate angle domain common image gathers (ADCIGs) for use in generating a final image of a subsurface of the earth. The processing device 1100 may be, for example, a computer, a processor, a server, or a network of computers, processors or servers. The processing device 1100 may include an interface 1102 configured to receive data from outside, e.g., seismic data. The interface 1102 may include internet connection, satellite connection, keyboards, etc. The processing device 1100 also includes a processor 1104 connected to the interface 1102 and configured to execute one or more or all of the steps discussed with regard to FIG. 4. The processing device 1100 may have dedicated circuitry for each step of FIG. 4 or the processor 1104 may be configured with software to execute all the steps shown in FIG. 4. The processing device 1100 may also include a display 1106 for displaying a final image calculated by the processor 1104. Various data used for calculating the final image may be stored in a storage device 1108 that is connected to the processor 1104 through a bus 1110. Other known components of a computer, server or processor may also be present.

The disclosed exemplary embodiments provide a system and a method for more accurately processing under-sampled data for generating an image related to a subsurface. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing seismic data under-sampled in an angle domain, the seismic data corresponding to a reverse time migration (RTM), three-dimensional, angle domain common image gather (ADCIG), the method comprising:
    receiving at a processing device the seismic data recorded with plural receivers;
    calculating, based on the seismic data, shot and receiver wave-fields with an RTM wave propagation engine;
    applying a wave-fields decomposition algorithm to obtain a propagation direction for the shot and receiver wave-fields;

forming the ADCIG by applying an image condition to the shot and receiver wave-fields;

determining that specular energies of the ADCIG are under-sampled around a reflection angle;

during the step of forming the ADCIG, extrapolating the specular energies to a neighborhood of the reflection angle; and generating an image of a subsurface that is being surveyed based on the extrapolated specular energies.

2. The method of claim 1, wherein the step of determining comprises:

calculating an angular sampling $d\theta$ based on the seismic data;

comparing the angular sampling $d\theta$ with a predetermined angular sampling $\Delta\theta$; and extrapolating the specular energies if the angular sampling $d\theta$ is larger than the predetermined angular sampling $\Delta\theta$.

3. The method of claim 2, wherein the angular sampling is calculated based on an actual shot spacing and a depth of an imaging point.

4. The method of claim 3, wherein the actual shot spacing is a distance between two consecutive shots and the imaging point is a point in the subsurface which is surveyed and reflects a shot.

5. The method of claim 2, wherein the step of extrapolating comprises:

using a ratio of the angular sampling $d\theta$ and the predetermined angular sampling $\Delta\theta$ to calculate the interpolated specular energy.

6. The method of claim 1, wherein the seismic data is regular in a time-space domain.

7. The method of claim 6, wherein the migrated seismic data is irregular in a subsurface angle domain.

8. The method of claim 1, wherein the step of migrating comprises:

mapping the input data from a five-dimension input space to a five-dimension output space, wherein dimensions of the input space include x and y positions of a source and a receiver, and a time, and dimensions of the output space include x and y positions of a migrated point, the time, and two angles associated with the migrated point.

9. A processing device for processing seismic data under-sampled in an angle domain, the seismic data corresponding to a reverse time migration, three-dimensional, angle domain common image gather (ADCIG), the processing device comprising:

an interface configured to receive the seismic data recorded with plural receivers; and a processor connected to the interface and configured to, calculate, based on the seismic data, shot and receiver wave-fields with an RTM wave propagation engine;

apply a wave-fields decomposition algorithm to obtain a propagation direction for the shot and receiver wave-fields;

form the ADCIG by applying an image condition to the shot and receiver wave-fields;

determine that specular energies of the ADCIG are under-sampled around a reflection angle; and during the step of forming the ADCIG, extrapolate the specular energies to a neighborhood of the reflection angle.

10. The processing device of claim 9, wherein the processor is further configured to:

calculate an angular sampling $d\theta$ based on the seismic data;

compare the angular sampling $d\theta$ with a predetermined angular sampling $\Delta\theta$; and extrapolate the specular energies if the angular sampling $d\theta$ is larger than the predetermined angular sampling $\Delta\theta$.

11. The processing device of claim 10, wherein the angular sampling is calculated based on an actual shot spacing and a depth of an imaging point.

12. The processing device of claim 11, wherein the actual shot spacing is a distance between two consecutive shots and the imaging point is a point in the subsurface which is surveyed and reflects a shot.

13. The processing device of claim 10, wherein the processor is further configured to:

use a ratio of the angular sampling $d\theta$ and the predetermined angular sampling $\Delta\theta$ to calculate the interpolated specular energy.

14. The processing device of claim 9, wherein the seismic data is regular in a time-space domain.

15. The processing device of claim 14, wherein the migrated seismic data is irregular in a subsurface angle domain.

16. The processing device of claim 9, wherein the processor is further configured to:

map the input data from a five-dimension input space to a five-dimension output space, wherein dimensions of the input space include x and y positions of a source and a receiver, and a time, and dimensions of the output space include x and y positions of a migrated point, the time, and two angles associated with the migrated point.

17. A non-transitory computer readable medium storing computer instructions, which, when run by a computer, process seismic data under-sampled in an angle domain, the seismic data corresponding to a reverse time migration, three-dimensional, angle domain common image gather (ADCIG), the instructions comprising:

receiving the seismic data recorded with plural receivers;

calculating, based on the seismic data, shot and receiver wave-fields with an RTM wave propagation engine;

applying a wave-fields decomposition algorithm to obtain a propagation direction for the shot and receiver wave-fields;

forming the ADCIG by applying an image condition to the shot and receiver wave-fields;

determining that specular energies of the ADCIG are under-sampled around a reflection angle;

during the step of forming the ADCIG, extrapolating the specular energies to a neighborhood of the reflection angle; and generating an image of a subsurface that is being surveyed based on the extrapolated specular energies.

18. The medium of claim 17, wherein the step of determining comprises:

calculating an angular sampling $d\theta$ based on the seismic data;

comparing the angular sampling $d\theta$ with a predetermined angular sampling $\Delta\theta$; and extrapolating the specular energies if the angular sampling $d\theta$ is larger than the predetermined angular sampling $\Delta\theta$.

19. The medium of claim 18, wherein the angular sampling is calculated based on an actual shot spacing and a depth of an imaging point.

20. The medium of claim 19, wherein the actual shot spacing is a distance between two consecutive shots and the imaging point is a point in the subsurface which is surveyed and reflects a shot.

* * * * *